(12) United States Patent
Babcock et al.

(10) Patent No.: US 6,271,704 B1
(45) Date of Patent: Aug. 7, 2001

(54) METHOD AND APPARATUS FOR BALANCING CURRENT IN A SYSTEM WITH TWO SETS OF TERMINATION DEVICES

(75) Inventors: Sean R. Babcock, Portland; Ananda Sarangi, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/459,854

(22) Filed: Dec. 14, 1999

(51) Int. Cl.[7] .................................................. H03K 5/09
(52) U.S. Cl. ............................ 327/309; 327/310; 327/551
(58) Field of Search .................................... 327/309, 310, 327/312, 530, 551, 565

(56) References Cited

U.S. PATENT DOCUMENTS 5,604,450 * 2/1997 Borkar et al. ........................ 326/82
5,729,154 * 3/1998 Taguchi et al. ...................... 326/30
6,008,682 * 12/1999 Mirov ................................. 327/333
6,064,507 * 5/2000 Heflinger et al. ................... 359/237
6,114,898 * 9/2000 Okayasu ............................. 327/437

* cited by examiner

Primary Examiner—Terry D. Cunningham
(74) Attorney, Agent, or Firm—Antonelli, Terry, Stout & Kraus, LLP

(57) ABSTRACT

A method and devices for a current dump circuit that includes a first termination device, a second termination device, and a current dump device. The first termination device resides outside the die of an IC. One end of the first termination device is operatively connected to a first voltage regulator. Another end of the first termination is device operatively connected to a signal line of the IC. The second termination device resides on a die of the IC. One end of the second termination device is operatively connected to a second voltage regulator. Another end of the second termination device is operatively connected to the signal line of the IC. The current dump device provides a path to remove any current flow between the first voltage regulator and the second voltage regulator.

26 Claims, 3 Drawing Sheets

METHOD AND APPARATUS FOR BALANCING CURRENT IN A SYSTEM WITH TWO SETS OF TERMINATION DEVICES

FIELD

This invention relates to termination devices, and more specifically to balancing current in a system with termination devices connected to different power sources.

BACKGROUND

Due to the rapid advance of technology, many times electronic systems and devices become outdated in a short amount of time. In these cases, a person may buy a new electronic system, and no longer have a use for the original system. One way to salvage the original electronic system is to determine if it can be modified to make it perform like the new electronic system. If this may be accomplished by only exchanging a few electronic components, this may be a much simpler and less costly process than a new system. The problem arises if the new electronic component when inserted into the same location as an original electronic component, has the potential to cause problems in the electronic system even though the interconnections are the same.

FIG. 1 shows a schematic diagram of an example circuit in an existing electronic system with an IC (Integrated Circuit) 2 that includes a die 4 on a package 6. IC 2 attaches to a motherboard 8 through socket 10. Vcc voltage regulator 12 supplies Vcc voltage to the core circuits in IC 2. Vtt voltage regulator 14 supplies voltage to termination devices 16 that is connected to IC 2 GTL (Gunning Transceiver Logic) signal line 18. Therefore, GTL signal line 18 has a termination device connected to it that is mounted on motherboard 8. Although FIG. 1 shows only one signal line, this is representative of all GTL or open drain type signal lines of IC 2 that connect to other devices on motherboard 8. There may also be open drain signal lines that are not GTL signal lines. These signal lines may be capable of using a higher termination voltage than the GTL signal lines. For this reason, IC 2 may receive voltages from the Vcc voltage and the Vtt voltage and depending on the devices attached to the non-GTL signal lines, supply a non-GTL signal line termination voltage 20, that is either the Vcc voltage or the Vtt voltage, to the termination devices attached to non-GTL signals (e.g., CMOS signals).

If a person desires to upgrade the electronic system shown in FIG. 1 for improved performance and/or functionality, IC 2 might need to be replaced with another improved IC. The improved IC must be electrically compatible with IC 2 in order to be attached to motherboard 8. A problem may arise when the improved IC is compatible with IC 2, but has termination devices on the die of the improved IC. That is, when the improved IC is attached to motherboard 8, the GTL signal lines now have termination on the motherboard, and termination on the die of the improved IC and such termination resistors may cause a conflict or degradation in an operation of the circuit.

As description of one example problem, an improved IC with termination on the die (not shown) will likely have the on die termination connected between the Vcc voltage from voltage regulator 12 and GTL signal line 18. As the number of IC 2 GTL signal lines 18 that are not pulled down to ground increases, the current flow from Vcc voltage regulator 12 to Vtt voltage regulator 14 may increase. Generally, most voltage regulators require a minimum amount of current to be sourced by the regulator for the voltage regulator to stay within the proper voltage regulation range. If most or all of the signals from IC 2 are pulled up through the termination devices, enough current may flow from Vcc voltage regulator 12 to Vtt voltage regulator 14 through the termination devices such that the minimum regulation current requirement for Vtt voltage regulator 14 is not met and, therefore, voltage regulator 14 shuts down. This may cause system problems, for example, unacceptable noise signal levels within the system.

A solution to this problem is to remove the current path between the voltage regulators. However, removing the current path may not be an option due to the fact that the design of already existing motherboards cannot be easily changed in the field and the need for on die termination with the new ICs. The motherboards have already been designed and currently may exist with termination on the motherboard. Therefore, the motherboard would need to be reworked when an IC with on die termination is inserted.

A further possible solution is to set the voltage regulators to voltages that will not cause current flow from the Vcc voltage regulator to the Vtt voltage regulator. However, setting both voltage regulators to voltages that will not cause current flow would likely require the Vcc voltage regulator to be set lower and possibly not allow for optimum IC performance (e.g., raising the Vcc voltage generally results in improved IC performance).

Therefore, a need exists for an arrangement allowing a semiconductor IC device with termination on the die that can be substituted for a semiconductor IC device with termination not on the die attached to an existing motherboard of an electronic system, and not have any potential for voltage regulators shutting off and causing system problems.

SUMMARY

A current dump circuit that includes a current dump device provided on an on-die or on-package peripheral attached to a system. The current dump device may be adapted to allow a predetermined minimum of current to flow from a voltage regulator so as to keep the voltage regulator operating within a predetermined operating range.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
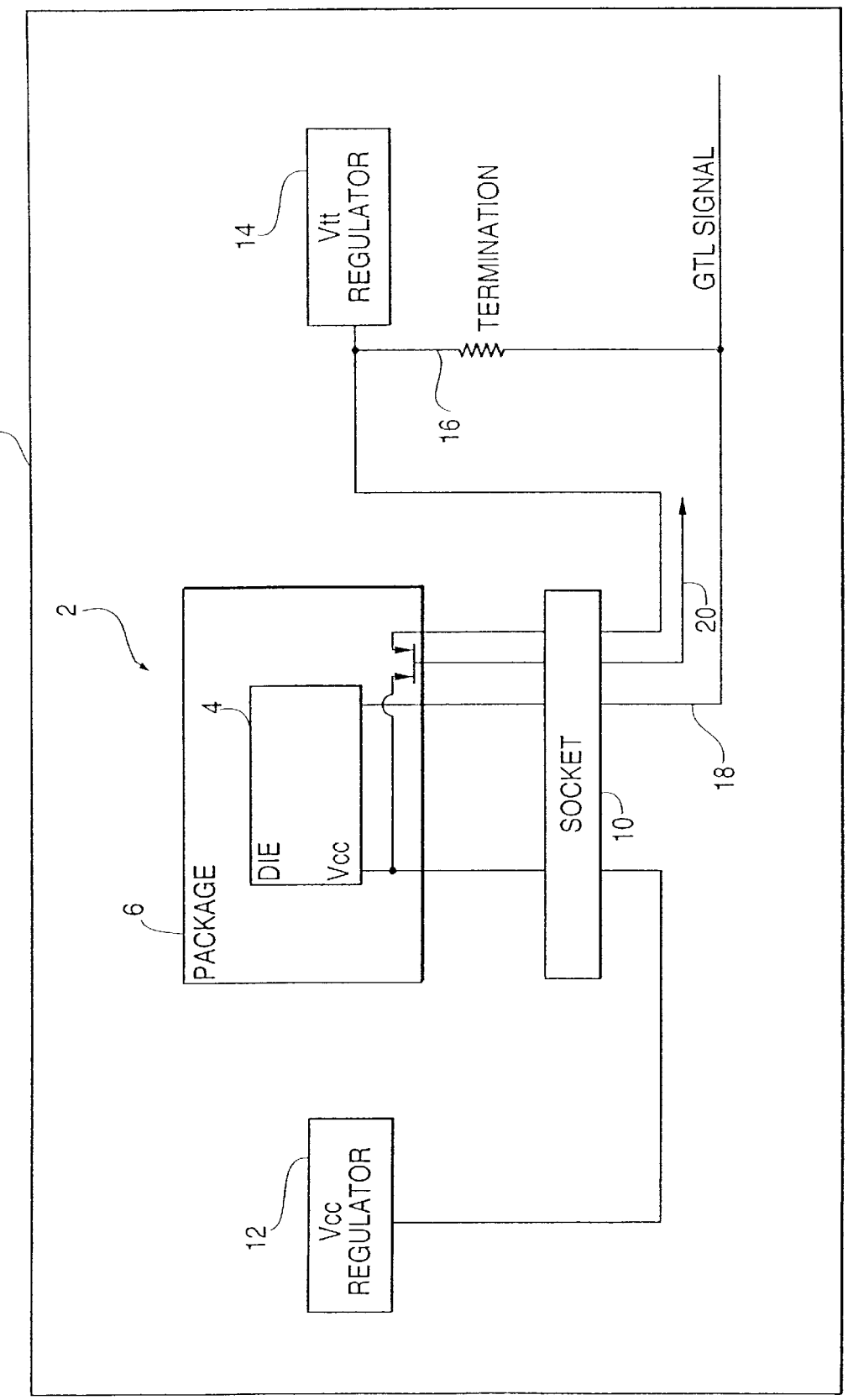
FIG. 1 is a schematic diagram of an example circuit with an IC attached to a motherboard that has termination devices.

The particulars shown herein are by way of example and for purposes of illustrative discussion of the example embodiments of the present invention only and are presented with the cause of providing a useful and readily understood description of the principles and conceptual aspects of the present invention. The description taken with the drawings make it apparent to those skilled in the art how the several forms of the present invention may be embodied in practice.

Moreover, when appropriate, like reference numerals and characters may be used to designate identical, corresponding or similar components in differing figure drawings. Further, example sizes/models/values/ranges may be given, although the present invention is not limited to the same. In addition, well known power connections to ICs and other components may not be shown within the figures for simplicity of illustration and discussion, and so as not to obscure the invention.

Many semiconductor integrated circuits (ICs) have one or more groups of signal lines that form a bus. A bus may be a group of signal lines that are functionally related, e.g., address lines, data lines, etc. The bus signals may exist only internal to the IC, or may carry signals that are transmitted and/or received externally by the IC. For example, most processors have at least one bus that includes several signal lines. Each one of these signal lines may be connected to many electronic devices. Therefore, generally, these signal lines are open drain signal lines, or Gunning Transceiver Logic (GTL) signal lines. This allows any electronic device connected to the signal line to drive the signal line to a low level (i.e., logic "0" level). However, a termination device, or pull-up device, is needed to hold the signal line at a high level (i.e., logic "1" level). The termination devices are also used to produce better signal quality. IC devices that are processors generally have termination devices on the signal lines of the processor busses. There may be other signal lines that are not part of a bus, but are GTL or similar signal lines, that also require the use of a termination device. Any GTL or open drain signal line will generally require a termination device.

Termination devices of an open drain or GTL bus may be connected to a power source. There may also be a requirement that the termination devices connected to signal lines be connected to a power source of a specific voltage. This may be due to the required voltage tolerance of the silicon, and/or performance requirements for the electronic system. Traditionally, the termination devices have been termination resistors, and have been placed on the motherboard of the electronic system that the IC is part of, or on the IC packaging.

Designers of future ICs (e.g., processors, memory, controllers, counters, etc.) may be concerned with saving cost and board real estate. In this regard, termination devices may be placed on the die of the IC, therefore, saving the cost of an external termination device, and saving real estate on the motherboard due to not needing the space for a termination device. However, this presents a potential problem when trying to upgrade an existing motherboard that previously contained an IC that used termination on the motherboard (i.e., not on the die), with an IC that now has termination on the die. In this situation, there are now two potentially conflicting termination devices, one on the motherboard and one on the die of the IC. The voltage to the termination on the IC may be connected to the same voltage regulator that supplies voltage to the other devices on the IC since there may be no package pin to receive the termination voltage from the motherboard. The die may, however, have separate input pins for the voltage to the termination device and the voltage to the other devices and, therefore, these two die pins may be tied together on the IC package. Thus, the on die termination may be connected to one voltage regulator (that supplies voltage to non-termination devices), and the termination on the motherboard may be connected to a second voltage regulator that supplies power to the termination devices on the motherboard.

Some older ICs may have been designed with the termination outside of the die of the IC. In these ICs, only one type of power signal input may exist on the IC (e.g., Vcc). In these cases, the termination usually exists on the motherboard. Therefore, ICs without termination on the die generally have only one power plane.

ICs with on die termination will usually have separate power planes for the core power, Vcc, and the power to the termination devices. There may also be separate inputs to the IC for receiving these two power sources. For ICs with termination on the die to be compatible with platforms (e.g., motherboards) that currently support ICs with termination outside of the die, some design changes may be needed. ICs with on die termination may have two separate inputs on the die for bringing in power. These two power inputs may need to be connected together on the IC package to a single power input (Vcc) at the socket of the IC package. Therefore, the termination on the die may be powered by the same voltage as the circuits included in the IC core. Termination on the die and termination outside the die may be required for some ICs based on signal quality concerns and reliability issues associated with the IC. When the termination on the die is connected to the termination used for the IC core circuits, problems in the system may arise.

Figure 2:
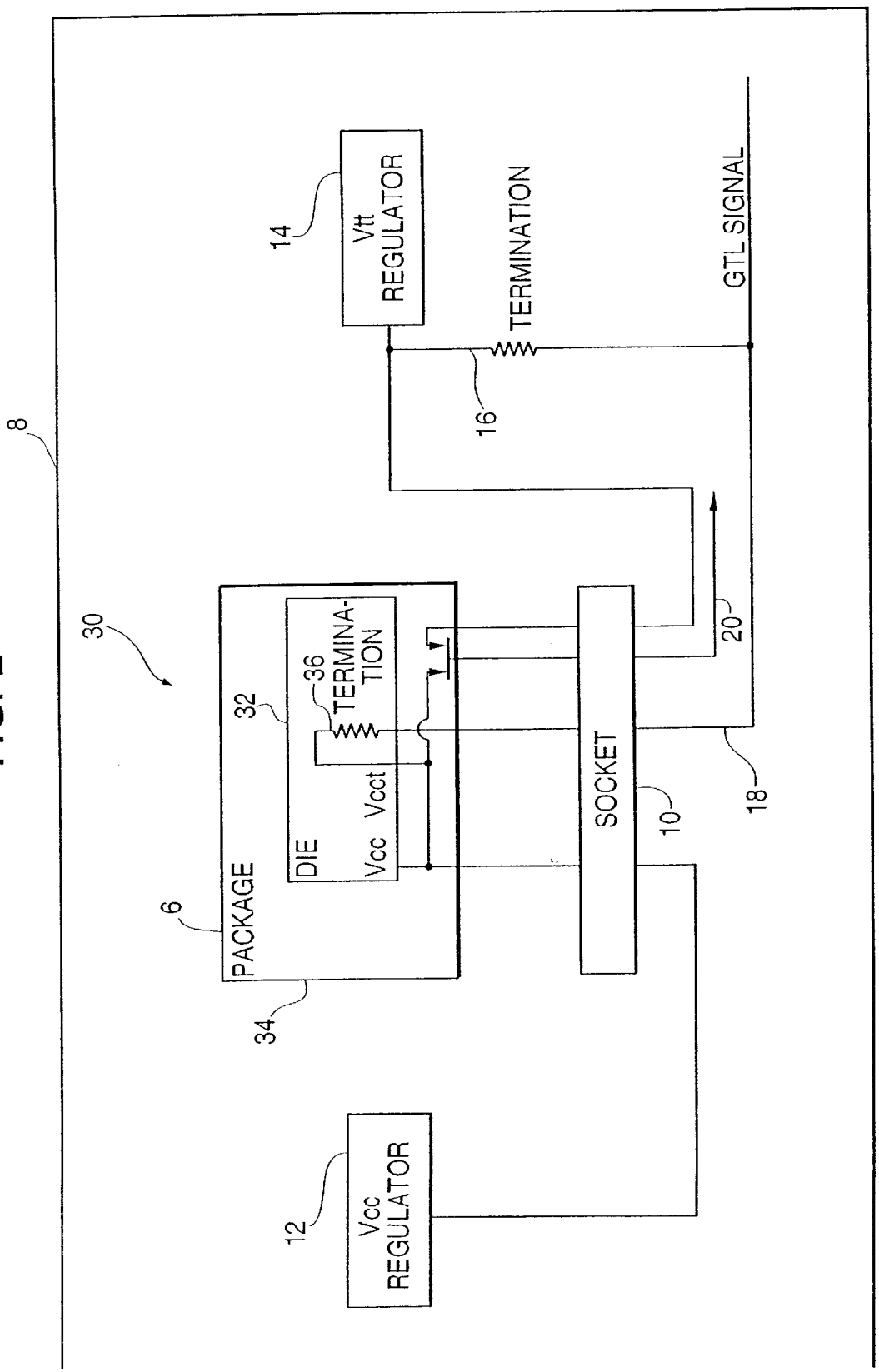
FIG. 2 is a schematic diagram of an example circuit with an IC, with on die termination, according to the present invention.

FIG. 2 shows a schematic diagram of an example circuit with an IC with on die termination attached to motherboard 8. In the circuit of FIG. 2, termination devices exist both on the die of IC 30, and outside the die (on the motherboard). In this circuit, IC 30, with on die termination, is being used in socket 10 on motherboard 8. Socket 10 previously supported IC 2, possibly an older version of IC 30, that did not have termination on die. IC 30 includes die 32 on package 34 and on die termination device 36. IC 30 plugs into motherboard 8 via socket 10. Voltage regulator 12 supplies power (Vcc) to the IC 30 core circuits, as well as other circuitry on motherboard 8. Voltage regulator 14 supplies power (Vtt) to the termination device 16 on motherboard 8. Each GTL signal line 18 has a termination device 16 and a termination device 36 attached.

The two termination devices (on die and off die) may be connected to different voltage regulators that produce substantially the same voltage. The two separate voltage regulators may be connected to each other through the two termination devices depending on the loading of the IC signals connected to the termination devices (e.g., when no device connected to the signal line is pulling the signal line low).

When all GTL signals lines 18 of IC 30 are in a logic "1", high state (i.e., pulled up to the Vtt termination voltage level by voltage Vtt regulator 14 and termination device 16), the two voltage regulators 12 and 14 may be connected together. Therefore, a potential current path may exist through the on die termination 36 and the off die termination 16 and GTL signal lines 18 between the two separate voltage regulators 12 and 14. Even if the Vcc voltage of voltage regulator 12 is set equal to the Vtt voltage of voltage regulator 14, the tolerances of both the Vcc and Vtt voltage regulators may possibly result in Vcc voltage regulator 12 driving a voltage higher than the voltage from Vtt voltage regulator 14 (similarly, the Vtt voltage may be higher than the Vcc voltage, but this scenario is less likely). The worst case current may flow from Vcc voltage regulator 12 to Vtt voltage regulator 14 when Vcc voltage regulator 12 is higher than its nominal value and Vtt voltage regulator 14 is lower than its nominal value. In this situation, voltage regulator 14 may shut down.

Voltage regulator 14 may shut down, for example, if GTL signals 18 are part of a bus, and the bus is idle for some period of time. In this scenario, no device attached to any of the GTL signal lines 18 are pulling any of the signal lines low, therefore, Vtt voltage regulator 14 may not be driving any current. If Vtt voltage regulator 14 shuts down, or turns off and on again in some dynamic fashion, this may cause some system operation problems. The regulator could possibly go into oscillation causing damage to the system as well as possibly adding noise to the Vtt power plane, thereby causing erratic system behavior. Also, when Vtt voltage regulator 14 shuts down, termination devices 16, 36 may not be terminating the signal lines to the desired voltage. Further, there may be large impedance mismatches on the GTL signal lines 18, and overall poor signal quality.

According to the present invention, compatibility of exchanging one IC that has signal line termination devices on the die of the IC for another currently used IC that has signal line termination devices outside the die, e.g., on the motherboard is provided for. The currently used IC may be mounted on an existing motherboard that has been designed for it. ICs that have signal line termination on the die usually require two separate power source inputs to the die, and have a split power plane on the die to accommodate these two power sources. One power source supplies power (e.g., Vcc) to the circuits on the IC (IC core), and its voltage value is determined by the technology of the circuits on the IC. This Vcc voltage value may also depend on the performance desired of the IC circuits. The other power source (e.g., Vcct) is used for the on die signal line termination devices or circuits. The voltage level used for the signal line termination devices or circuits (e.g. Vcct) may be different from that used for the IC core (e.g., Vcc) and, therefore, the level of each voltage may be set independently. In some cases, the voltage to be used for signal line termination may be set by a specification or requirements document related to the IC and/or its signal lines.

Figure 3:
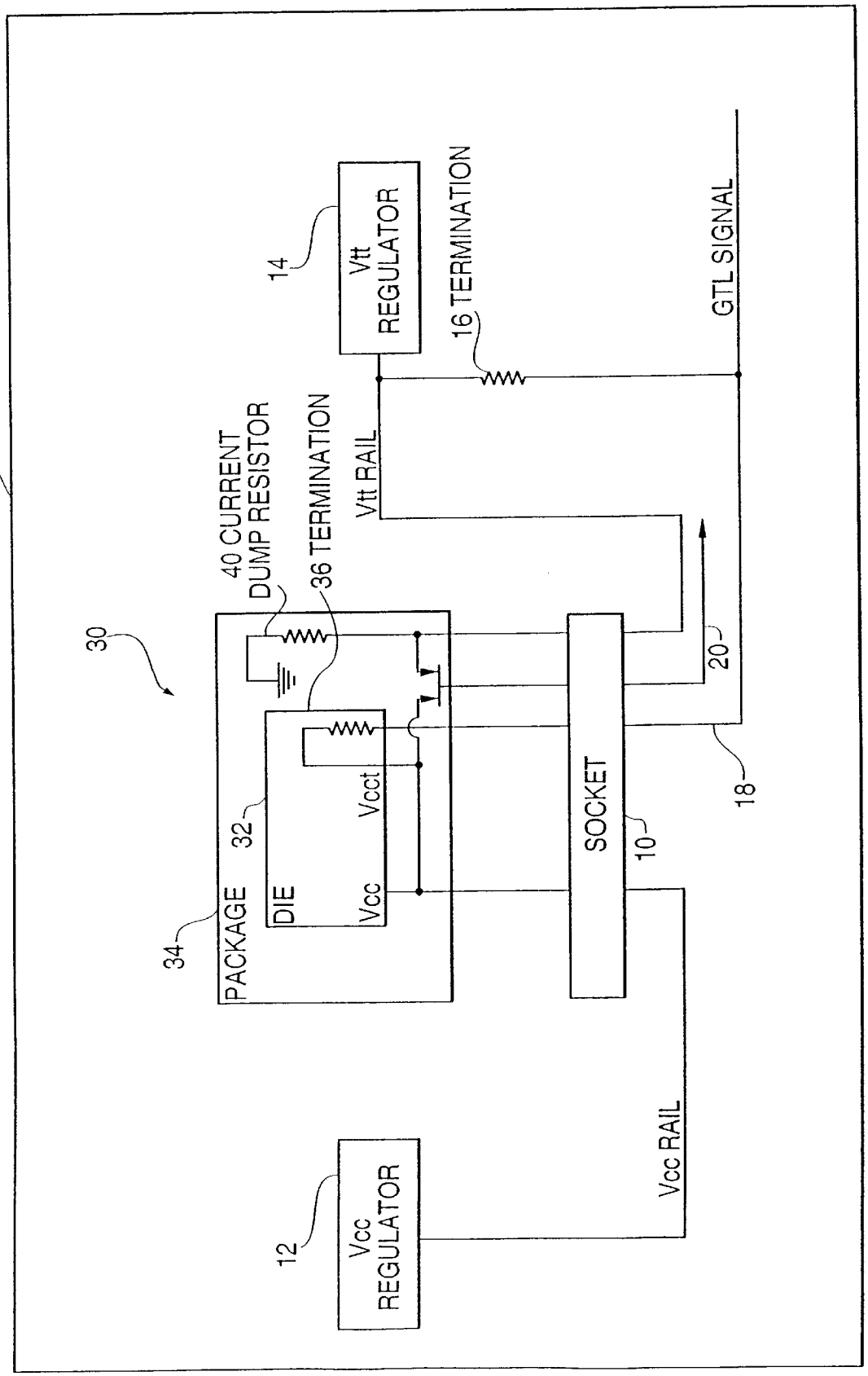
FIG. 3 is a schematic diagram of an example advantageous current dump circuit according to the present invention.

According to the present invention, a current dumping device may be added from the termination voltage Vtt to ground (FIG. 3, described ahead). This current dumping device may be located on the IC package. Therefore, the current dumping device follows the IC that has on die termination into any platform that the IC with on die termination is plugged into. If the IC with termination on die is attached to a slot on a platform that was designed to support an IC with termination not on the die, the platform may potentially have the problem of the voltage regulators mentioned previously. The package of the IC may have the ability to support components other than the die (e.g., resistors, capacitors, etc). Further, the IC package, for ICs that have on die termination, will likely have a second input for power that connects to the Vtt power for the on die termination circuit or device. This second power input is separate from the input that brings in power (Vcc) for the rest of the core circuits on the IC.

FIG. 3 shows an example current dumping circuit according to the present invention. IC 30 includes die 32 contained in package 34, on die termination device 36, and current dump device 40. IC 30 attaches to motherboard 8 through socket 10. Voltage regulator 12 supplies Vcc power to the core circuits of IC 30 through an input on package 34. Die 32 may have separate inputs for Vcc power to the core circuits of IC 30, and Vcct power to the one or more termination devices 36. These two inputs may be connected together on package 34 whereby both inputs then receive Vcc power from Vcc voltage regulator 12. Vtt voltage regulator 14 supplies Vtt termination power to termination devices 16. Vtt voltage regulator 14 also may supply power to current dump devices 40 through an input to IC 30. At least one termination device 16 and at least one termination device 36 are connected to each GTL (Gunning Transceiver Logic) signal line 18 of IC 30. Signal line 18 may not be a GTL signal, but may be any signal line type where any device connected to the signal line can pull the line low, but no device can pull the signal line high. To pull the signal line high, a termination device is needed. Open drain signal lines are of this type. Each GTL signal line 18 of IC 30 may have two termination devices connected to it, one on die 36, and one outside the die 16 (e.g., on motherboard 8).

The addition of current dump device 40 on package 34 of IC 30 eliminates the problem noted previously regarding the potential for one of the voltage regulators turning off. Current dump device 40 eliminates this problem by providing a path to ground for any current that may flow from one voltage regulator to another. If a situation develops where no device is driving any of the GTL signal lines 18 low, Vcc voltage regulator 12 may be connected to Vtt voltage regulator 14 through termination devices 16 and 36. However, current dump device 40 provides a low resistance path to ground therefore, dissipating any current increase from Vcc voltage regulator 12 to Vtt voltage regulator 14.

Thus, current dump device 40 allows both regulators to stay operational by providing ample current flow in all situations. Moreover, since current dump device 40 is on the package 34 of IC 30, current dump device 40 follows IC 30 into all platforms or motherboards that IC 30 may be installed into. This is most advantageous for platforms that already exist which cannot be modified to have the current dump device on the motherboard. This allows more flexibility in upgrading and extending the lifetime of electronic systems already in existence. Further, the IC core Vcc voltage may be changed to allow higher performance since simply changing the value of the current dump device will compensate for a change in Vcc voltage. In addition, no modifications are required to motherboards that currently exist and no system flexibility is lost.

One example embodiment of the use of the present invention is when the IC is a processor. Due to advances in technology, processors used in electronic systems, such as computers, are constantly being improved. Many times, the improvement is in the performance and technology used for the circuits of the processor. In these cases, the new and improved processor may be still pin compatible with slower or older versions of the processor. However, the new and improved processor may now have on die termination that the older processors did not have. The present invention allows replacing the older processors with the new and improved processors, therefore, attaining the advantages noted previously, for example, more flexibility in upgrading and extending the lifetime of computer systems already in existence.

Table 1 shows some example values for the various current dump circuit elements according to the present invention when the IC may be a processor with GTL signal lines and non-GTL (e.g., CMOS) signal lines that require termination devices.

TABLE 1

| | |
|---|---|
| Vcc voltage regulator voltage | 1.65 volts |
| Vcct voltage | 1.65 volts |
| Vtt voltage regulator voltage | 1.5 volts |
| Non-GTL signal line termination voltage | 2.5 or 1.5 volts |
| On-die termination device (resistor used) | 110 ohms |
| Number of signal lines terminated | 144 |
| Motherboard termination device (resistor used) | 56 ohms |
| Current dump device (resistor used) | 12 ohms |

In the example set of values in table 1, and in FIGS. 1–3, resistors have been used for all termination devices and current dump devices. However, any type device, or combination of devices, that may allow termination of a signal line, or dump current may be used and still be within the spirit and scope of the present invention (e.g., resistors, transistors, MOSFETs, etc.).

To calculate the value of the current dump device, the voltages and tolerances of the regulator voltages are used. These values may be set by design requirements documents related to the electronic system. The value and the number of termination devices must also be determined. These values once known, are used to determine the values for the current dump devices. The value of the current dump devices used may be different (e.g., lower resistor value) than determined to allow more current to be dumped and, therefore, allowing some margin to insure continued operability of the electronic system in all situations.

Heat from the current dump device is no problem since in most cases, the IC package is cooled thus also cooling the current dump device. A worst case determination may be made by determining the maximum mismatch between regulators, the maximum mismatch between on die and off die (e.g., on motherboard) termination, and calculating a possible maximum current through the current dump device. Once this is determined, a wattage rating for the current dump devices may be determined. Further, the heat generated by the current dump device may be negligible compared to the heat generated from the die. Therefore, heat from the current dump devices will not affect the die.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular networks, materials, and embodiments, the present invention is not intended to be limited to the particulars disclosed herein, rather, the present invention extends to all functionally equivalent structures, methods and uses, such as are within the scope of the appended claims.

For example, the example embodiments described previously show the current dump devices on the package of the IC. However, the current dump devices may also be incorporated on the die of the IC and still be within the spirit and scope of the present invention. Generally, however, motherboards will likely have been designed to support on die termination before it may be practical to incorporate the current dump devices on the IC die. Further, the figures show one termination device and one current dump device, however, each device shown may represent one or multiple devices in the same connection. The voltage regulators shown may be on or outside of the motherboard. The IC package may be any of many known packages, e.g., PGA (Pinned Grid Array), FCPGA (Flip Chip Pinned Grid Array), etc. Moreover, the current dump device may be supplied power from a different voltage regulator than shown in the figures and still be within the spirit and scope of the present invention.

What is claimed is:

1. A system comprising:
   a first termination device, the first termination device residing outside the die of an IC, one end of the first termination device operatively connected to a first voltage regulator, another end of the first termination device operatively connected to a signal line of the IC;
   a second termination device, the second termination device residing on a die of the IC, one end of the second termination device operatively connected to a second voltage regulator, another end of the second termination device operatively connected to the signal line of the IC; and
   a current dump device, the current dump device being operatively connected to the first voltage regulator and the second voltage regulator, the current dump device adapted to allow a predetermined minimum of current to flow from the first voltage regulator and the second voltage regulator so as to keep the first voltage regulator and the second voltage regulator operating within respective predetermined operating ranges.

2. The system according to claim 1, wherein the current dump device resides on a package of the IC.

3. The system according to claim 1, wherein the current dump device resides outside a package of the IC.

4. The system according to claim 1, wherein the current dump device resides on a die of the IC.

5. The system according to claim 1, the first termination device residing on the die.

6. The system according to claim 1, the first termination device residing on a motherboard of an electronic system.

7. The system according to claim 1, the first termination device comprising at least one of a resistor, a transistor, and a MOSFET.

8. The system according to claim 1, the second termination device comprising at least one of a resistor, a transistor, and a MOSFET.

9. The system according to claim 1, the current dump device comprising at least one of a resistor, a transistor, and a MOSFET.

10. The system according to claim 1, at least one of the first voltage regulator and the second voltage regulator residing a motherboard of an electronic system.

11. The system according to claim 1, the signal line comprising at least one of a GTL type signal line and a open drain type signal line.

12. An IC package comprising:
    a die, the die residing on an IC package of an IC, the die containing at least one first termination device, the at least one first termination device operatively connected to a first voltage regulator and a signal line of the IC, the signal line operatively connected to a second voltage regulator and a second termination device, wherein the second termination device is outside the die of the IC; and
    at least one current dump device, the at least one current dump device residing on the IC package, the at least one current dump device being operatively connected to the first voltage regulator and the second voltage regulator, the at least one current dump device adapted to allow a predetermined minimum of current to flow from the first voltage regulator and the second voltage regulator so as to keep the first voltage regulator and the second voltage regulator operating within respective predetermined operating ranges.

13. A computer system having a motherboard which has attached at least one IC, the at least one IC receiving power from a first voltage regulator and a second voltage regulator, the at least one IC comprising:

a die, the die residing on an IC package of the at least one IC, the die containing at least one first termination device, the at least one first termination device operatively connected to the first voltage regulator and a signal line of the at least one IC, the signal line operatively connected to the second voltage regulator and a second termination device, wherein the second termination device is outside the die of the at least one IC; and at least one current dump device, the at least one current dump device residing on the IC package, the at least one current dump device being operatively connected to the first voltage regulator and the second voltage regulator, the at least one current dump device providing a path to remove any current flow between the first voltage regulator and the second voltage regulator.

14. The computer claimed in claim 13, the second termination device residing on the package of the IC.

15. The computer claimed in claim 13, the second termination device residing on the motherboard.

16. The computer claimed in claim 13, at least one of the first termination device and the second termination device comprising a transistor.

17. The computer claimed in claim 13, further comprising providing the second termination device on a motherboard of an electronic system designed with the second IC.

18. The computer claimed in claim 13, at least one of the first termination device and the second termination device comprising at least one of a resistor, a transistor, and a MOSFET.

19. The computer claimed in claim 13, the current dump device comprising at least one of a resistor, a transistor, and a MOSFET.

20. A method for allowing a first IC that has electrical signal termination on the die of the first IC to be substituted for a second IC that does not have electrical signal termination on the die of the second IC, the second IC currently connected in an electrical circuit designed for the second IC, said method comprising:

providing a signal termination device on a die of the first IC for a signal line of the first IC, the signal termination device connected to a first voltage regulator;

providing a second signal termination device for the signal line, the second termination device residing outside the die of the first IC, the second signal termination device connected to a second voltage regulator; and providing a current dump device, the current dump device adapted to allow a predetermined minimum of current to flow from the first voltage regulator and the second voltage regulator so as to keep the first voltage regulator and the second voltage regulator operating within respective predetermined operating ranges, wherein the first IC may be substituted for the second IC.

21. The method as claimed in claim 20, the current dump device being connected between ground and at least one of the first voltage regulator and the second voltage regulator.

22. The method as claimed in claim 20, further comprising providing the second termination device on a package of the IC.

23. The method as claimed in claim 20, further comprising providing the second termination device on a motherboard of an electronic system designed with the second IC.

24. The method as claimed in claim 20, at least one of the first termination device and the second termination device comprising at least one of a resistor, a transistor, and a MOSFET.

25. The method as claimed in claim 20, the current dump device comprising at least one of a resistor, a transistor, and a MOSFET.

26. The method as claimed in claim 20, further comprising:

determining worst case conditions of the first voltage regulator voltage, the second voltage regulator voltage, the first termination device resistance, and the second termination device resistance; and selecting the current dump device such that under all the worst case conditions the first voltage regulator and the second voltage regulator are kept operational.

* * * * *